(12) United States Patent
Nuno et al.

(10) Patent No.: US 10,168,088 B2
(45) Date of Patent: Jan. 1, 2019

(54) AIR CONDITIONING DEVICE HAVING BYPASS AND BEING OPERABLE IN A POSITIVE CYCLE DEFROSTING MODE

(71) Applicant: DAIKIN INDUSTRIES, LTD., Osaka-shi, Osaka (JP)

(72) Inventors: Hayato Nuno, Kusatsu (JP); Tomoyuki Haikawa, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 284 days.

(21) Appl. No.: 15/025,240

(22) PCT Filed: Sep. 25, 2014

(86) PCT No.: PCT/JP2014/075466
§ 371 (c)(1),
(2) Date: Mar. 25, 2016

(87) PCT Pub. No.: WO2015/046350
PCT Pub. Date: Apr. 2, 2015

(65) Prior Publication Data
US 2016/0238297 A1    Aug. 18, 2016

(30) Foreign Application Priority Data

Sep. 30, 2013 (JP) ................................ 2013-203368

(51) Int. Cl.
*F25B 1/10* (2006.01)
*F25B 47/02* (2006.01)
(Continued)

(52) U.S. Cl.
CPC ............ *F25B 47/025* (2013.01); *F25B 13/00* (2013.01); *F25B 41/04* (2013.01); *F25B 41/062* (2013.01);
(Continued)

(58) Field of Classification Search
CPC ... F24F 11/42; F25B 2600/2501; F25B 41/04; F25B 47/02
(Continued)

(56) References Cited

U.S. PATENT DOCUMENTS 4,286,435 A    9/1981    Cann et al.

FOREIGN PATENT DOCUMENTS

JP     61-262560 A    11/1986
JP     62-138660 A    6/1987
(Continued)

OTHER PUBLICATIONS

International Preliminary Report of corresponding PCT Application No. PCT/JP2014/075466 dated Apr. 14, 2016.
European Search Report of corresponding EP Application No. 14 84 9976.7 dated Apr. 28, 2017.
(Continued)

*Primary Examiner* — Henry Crenshaw
(74) *Attorney, Agent, or Firm* — Global IP Counselors, LLP

(57) ABSTRACT

An air conditioning device includes a main refrigerant circuit and a discharge-intake bypass circuit. The refrigerant circuit is operable in a heating mode and a positive cycle defrosting mode. It is possible for refrigerant to bypass from a discharge side to an intake side of the compressor when the refrigerant circuit is operating in the heating mode. The refrigerant circuit is operable in a positive cycle defrosting mode. When the refrigerant circuit is operating in the positive cycle defrosting mode, a superheat valve of the discharge-intake bypass circuit is opened and the refrigerant is caused to bypass from the discharge side to the intake side of the compressor through the bypass circuit and a defrosting-mode main valve high-pressure control is performed to adjust a valve opening of a main valve so that a high pressure level of a refrigerating cycle in the refrigerant circuit reaches a target high pressure.

18 Claims, 11 Drawing Sheets

(51) Int. Cl.
  *F25B 13/00* (2006.01)
  *F25B 41/04* (2006.01)
  *F25B 41/06* (2006.01)
  *F24F 11/42* (2018.01)
(52) U.S. Cl.
  CPC .............. *F25B 47/02* (2013.01); *F24F 11/42* (2018.01); *F25B 2313/02741* (2013.01); *F25B 2313/0314* (2013.01); *F25B 2313/0315* (2013.01); *F25B 2341/065* (2013.01); *F25B 2400/04* (2013.01); *F25B 2600/111* (2013.01); *F25B 2600/2501* (2013.01); *F25B 2600/2513* (2013.01); *F25B 2700/2104* (2013.01); *F25B 2700/2106* (2013.01); *F25B 2700/21152* (2013.01)

(58) Field of Classification Search
  USPC .......................................................... 62/151
  See application file for complete search history.

(56) References Cited

FOREIGN PATENT DOCUMENTS

| | | | |
|---|---|---|---|
| JP | 7-243728 | A | 9/1995 |
| JP | 2004-198027 | A | 7/2004 |
| JP | 2010-139097 | A | 6/2010 |
| JP | 2013-53782 | A | 3/2013 |
| WO | 2007/013382 | A1 | 2/2007 |

OTHER PUBLICATIONS

International Search Report of corresponding PCT Application No. PCT/JP2014/075466 dated Jan. 6, 2015.

AIR CONDITIONING DEVICE HAVING BYPASS AND BEING OPERABLE IN A POSITIVE CYCLE DEFROSTING MODE

CROSS-REFERENCE TO RELATED APPLICATIONS

This U.S. National stage application claims priority under 35 U.S.C. § 119(a) to Japanese Patent Application No. 2013-203368, filed in Japan on Sep. 30, 2013, the entire contents of which are hereby incorporated herein by reference.

TECHNICAL FIELD

The present invention relates to an air conditioning device, and in particular to an air conditioning device having a discharge-intake bypass circuit used during positive cycle defrosting mode, to defrost an outdoor heat exchanger while circulating a refrigerant through a compressor, an indoor heat exchanger, a main valve, and the outdoor heat exchanger, in the stated order.

BACKGROUND ART

In the prior art, there is described an air conditioning device like that indicated in Japanese Laid-open Patent Application No. 61-262560, having a compressor, an indoor heat exchanger, a throttle device (main valve), and an outdoor heat exchanger. This air conditioning device is capable of a heating mode in which a refrigerant is circulated through the compressor, the indoor heat exchanger, the main valve, and the outdoor heat exchanger in the stated order, and also has a discharge-intake bypass circuit allowing the refrigerant to bypass from the discharge side of the compressor to the intake side of the compressor during heating mode. The design of this air conditioning device is such that, during positive cycle defrosting mode to defrost the outdoor heat exchanger while circulating the refrigerant through the compressor, the indoor heat exchanger, the main valve, and the outdoor heat exchanger in the stated order, a valve (superheat valve) on the discharge-intake bypass circuit is opened, allowing the refrigerant to bypass from the discharge side of the compressor to the intake side of the compressor through the discharge-intake bypass circuit.

SUMMARY

In the aforedescribed air conditioning device of the prior art, the main valve is opened to nearly a fully open state during the positive cycle defrosting mode. For this reason, it is difficult for the high pressure level of the refrigerating cycle to rise sufficiently, leading to a tendency to fall into a vicious cycle in which power input to the compressor is reduced, as a result of which the quantity of heat that can be used for defrosting decreases, liquid backflow into the compressor increases, the high pressure level of the refrigerating cycle decreases further, and power input to the compressor decreases. There is a risk that, at some point, the positive cycle defrosting mode can no longer continue, due to this vicious cycle.

An object of the present invention is to provide an air conditioning device having a discharge-intake bypass circuit used during positive cycle defrosting mode to defrost an outdoor heat exchanger while circulating a refrigerant through a compressor, an indoor heat exchanger, a main valve, and the outdoor heat exchanger in the stated order, wherein the high pressure level of the refrigerating cycle is maintained at a high level, power input to the compressor is increased, and the quantity of heat for defrosting can be ensured.

The air conditioning device according to a first aspect of the present invention has a main refrigerant circuit, and a discharge-intake bypass circuit. The main refrigerant circuit has a compressor, an indoor heat exchanger, a main valve, and an outdoor heat exchanger, and is capable of running in a heating mode to circulate a refrigerant through the compressor, the indoor heat exchanger, the main valve, and the outdoor heat exchanger in the stated order. The discharge-intake bypass circuit has a superheat valve, and is connected to the main refrigerant circuit such that at times of running in heating mode, it is possible for the refrigerant to bypass from the discharge side of the compressor to the intake side of the compressor. At times of running in a positive cycle defrosting mode to defrost the outdoor heat exchanger while circulating refrigerant through the compressor, the indoor heat exchanger, the main valve, and the outdoor heat exchanger in the stated order, the superheat valve is opened and refrigerant caused to bypass from the discharge side of the compressor to the intake side of the compressor through the discharge-intake bypass circuit, and defrosting-mode main valve high-pressure control is carried out to adjust the valve opening of the main valve so that the high pressure level of the refrigerating cycle in the main refrigerant circuit reaches a target high pressure. A control unit of the air conditioning device carries out the above controls.

According to the aspect of the invention described above, at times of running in the positive cycle defrosting mode, the valve opening of the main valve is adjusted so that the high pressure level of the refrigerating cycle in the main refrigerant circuit reaches a target high pressure (defrosting-mode main valve high-pressure control). For this reason, at times of running in the positive cycle defrosting mode, the high pressure level of the refrigerating cycle can be maintained near the desired target high pressure. In so doing, power input to the compressor increases, and as a result, a quantity of heat that can be used for defrosting can be ensured. Running in the positive cycle defrosting mode can then continue.

An air conditioning device according to a second aspect of the present invention is the air conditioning device according to the first aspect of the present invention, wherein the target high pressure is set to a value that is close to the upper limit value of high pressure when running in heating mode. The control unit of the air conditioning device carries out the above target high pressure setting.

According to the aspect of the invention described above, because the target high pressure is set to a value that is close to the upper limit value of the high pressure level when running in heating mode, the high pressure level of the refrigerating cycle can be maintained at a high level at times of running in the positive cycle defrosting mode. In so doing, the quantity of heat that can be used for defrosting can be increased to a large amount at times of running in the positive cycle defrosting mode.

An air conditioning device according to a third aspect of the present invention is the air conditioning device according to the first or second aspect of the present invention, wherein the high pressure level is obtained from refrigerant temperature detected by an indoor heat exchanger temperature sensor furnished to the indoor heat exchanger. The control unit of the air conditioning device carries out the above high pressure level obtaining.

According to the aspect of the invention described above, because the high pressure level of the refrigerating cycle is obtained by the indoor heat exchanger temperature sensor in the aforedescribed manner, there is no need to provide a pressure sensor for obtaining the high pressure of the refrigerating cycle.

An air conditioning device according to a fourth aspect of the present invention is the air conditioning device according to any of the first to third aspects of the present invention, wherein, when running in the heating mode, heating-mode main valve discharge temperature control to adjust the valve opening of the main valve is carried out on the basis of the temperature of refrigerant at the discharge side of the compressor. The control unit of the air conditioning device carries out the above control.

According to the aspect of the invention described above, control of the valve opening of the main valve on the basis of the temperature of refrigerant at the discharge side of the compressor at times of running in heating mode (heating-mode main valve discharge temperature control), and control to bring the high pressure level of the refrigerating cycle to a target high pressure at times of running in the positive cycle defrosting mode (defrosting-mode main valve high-pressure control), are carried out in the aforedescribed manner. In so doing, it is possible to switch to optimal control of the valve opening of the main valve, according to the running mode.

An air conditioning device according to a fifth aspect of the present invention is the air conditioning device according to any of the first to fourth aspects of the present invention, wherein when running in the positive cycle defrosting mode, defrosting-mode discharge temperature control is carried out to adjust the valve opening of the superheat valve such that the degree of superheat of refrigerant at the discharge side of the compressor is brought to a target discharge degree of superheat. The control unit of the air conditioning device carries out the above control.

According to the aspect of the invention described above, at times of running in the positive cycle defrosting mode, the valve opening of the superheat valve is adjusted such that the degree of superheat of refrigerant at the discharge side of the compressor is brought to a target discharge degree of superheat (defrosting-mode discharge temperature control). For this reason, at times of running in the positive cycle defrosting mode, both excessive liquid backflow to the compressor, and seize-up and/or damage to the compressor due to a state of excessive superheat of the refrigerant intake to the compressor, can be minimized. In so doing, the reliability of the compressor at times of running in the positive cycle defrosting mode can be ensured.

An air conditioning device according to a sixth aspect of the present invention is the air conditioning device according to any of the first to fifth aspects of the present invention, further having an outdoor fan for supplying air to the outdoor heat exchanger, wherein when running in the positive cycle defrosting mode, defrosting-mode outdoor fan control is carried out to run the outdoor fan in cases in which refrigerant temperature detected by an outdoor heat exchange temperature sensor furnished to the outdoor heat exchanger has not risen to a fan stop temperature which is a value close to the outside air temperature, and to halt the outdoor fan in cases in which the temperature has risen to the fan stop temperature. The control unit of the air conditioning device carries out the above control.

According to the aspect of the invention described above, at times of running in the positive cycle defrosting mode, rather than constantly keeping the outdoor fan at a halt, control is carried out in the aforedescribed manner, to operate the outdoor fan until the refrigerant temperature in the outdoor heat exchanger rises to close to the outside air temperature (the fan stop temperature in the above aspect), and thereafter halt the outdoor fan (defrosting-mode outdoor fan control). For this reason, while the outdoor fan is operating, the outdoor heat exchanger can be defrosted using the quantity of heat obtained from power input to the compressor, and the quantity of heat obtained from heat exchange with the air. In so doing, the defrosting time at times of running in the positive cycle defrosting mode can be shortened.

DESCRIPTION OF EMBODIMENTS

An embodiment of the present invention and modifications thereof will be described below, on the basis of the drawings. The specific configuration of the air conditioning device according to the present invention is not limited to those of the following embodiment and modifications, and various alterations are possible within the scope and spirit of the invention.

(1) Configuration of Air Conditioning Device

Figure 1:
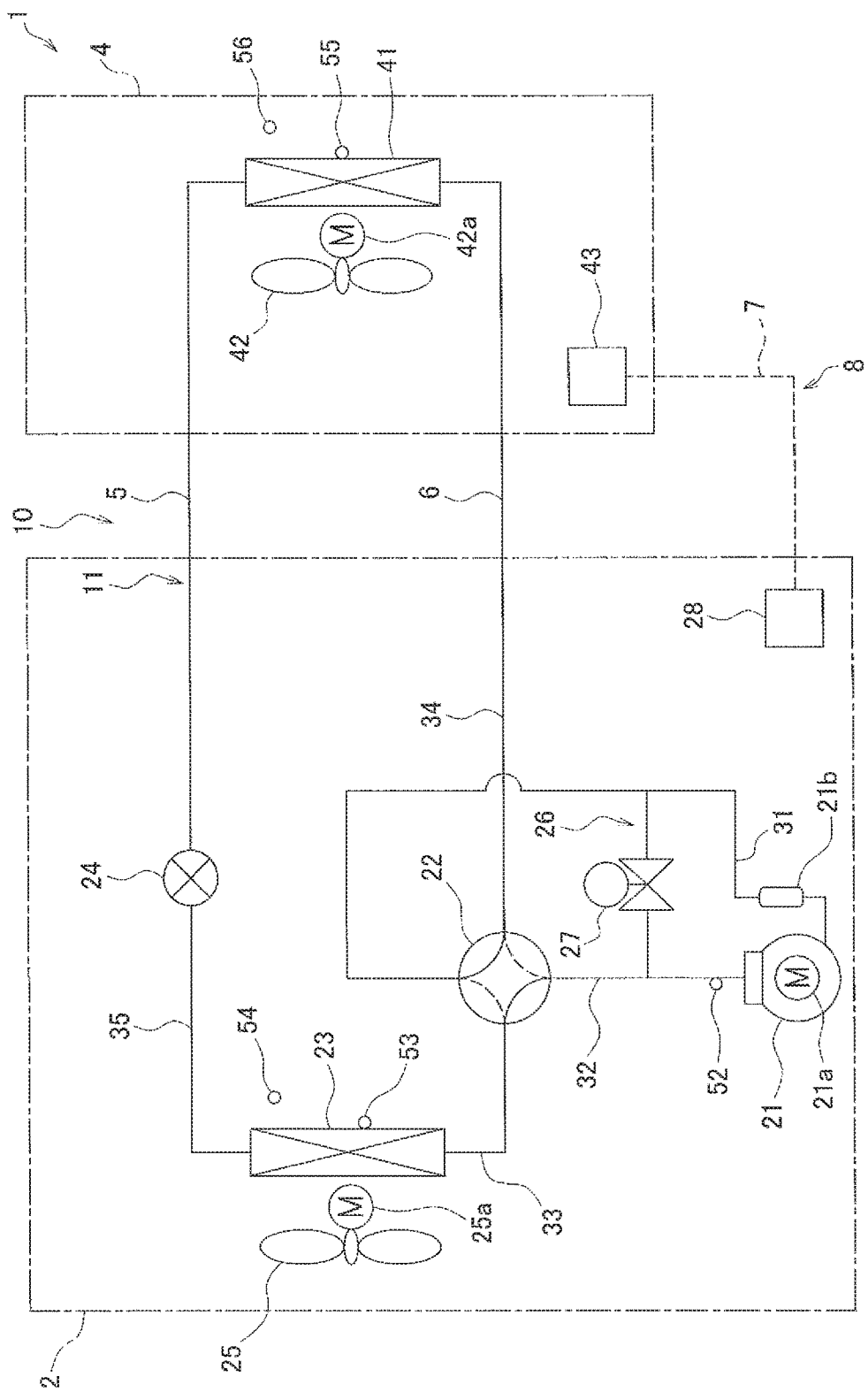
FIG. 1 is a simplified schematic diagram of an air conditioning device according to an embodiment of the present invention.

FIG. 1 is a simplified schematic diagram of an air conditioning device 1 according to an embodiment of the present invention.

The air conditioning device 1 is a device capable of carrying out a vapor-compression refrigerating cycle in order to cool and heat the inside of a building or the like. The air conditioning device 1 is configured mainly by connecting an outdoor unit 2 and an indoor unit 4. In the present embodiment, the outdoor unit 2 and the indoor unit 4 are connected through a liquid refrigerant communication pipe 5 and a gas refrigerant communication pipe 6. Specifically, a vapor compression refrigerant circuit 10 of the air conditioning device 1 is configured by connecting the outdoor unit 2 and the indoor unit 4 through the refrigerant communication pipes 5, 6.

(Indoor Unit)

The indoor unit 4 is installed indoors, and configures part of the refrigerant circuit 10. The indoor unit 4 mainly has an indoor heat exchanger 41.

The indoor heat exchanger 41 is a heat exchanger that, at times of running in cooling mode, functions as an evaporator of the refrigerant and cools the indoor air, and at times of running in heating mode, functions as a radiator of the refrigerant and heats the indoor air. The liquid side of the indoor heat exchanger 41 is connected to the liquid refrigerant communication pipe 5, and the gas side of the indoor heat exchanger 41 is connected to the gas refrigerant communication pipe 6.

The indoor unit 4 has an indoor fan 42 for taking indoor air into the indoor unit 4, and after heat exchange with the refrigerant has taken place in the indoor heat exchanger 41, supplying the air as supplied air to the indoors. Specifically, the indoor unit 4 has the indoor fan 42 as a fan which supplies indoor air to the indoor heat exchanger 41, as a heat source or a cooling source for the refrigerant flowing through the indoor heat exchanger 41. Here, a centrifugal fan and/or a multiblade fan or the like driven by an indoor fan motor 42a capable of rotation speed control may be used as the indoor fan 42.

The indoor unit 4 is furnished with sensors of various kinds. Specifically, the indoor heat exchanger 41 is furnished with an indoor heat exchange temperature sensor 55 for detecting the temperature Txi of the refrigerant in the indoor heat exchanger 41. The indoor unit 4 is also furnished with an indoor temperature sensor 56 for detecting the temperature Tra of the intake of indoor air to the indoor unit 4.

The indoor unit 4 has an indoor-side control unit 43 that controls the operation of the various parts constituting the indoor unit 4. The indoor-side control unit 43 has a microcomputer and/or a memory or the like, furnished for the purpose of controlling the indoor unit 4, and is designed to be able to exchange control signals or the like with a remote control (not illustrated) used for individual control input to the indoor unit 4, and to exchange control signals or the like with the outdoor unit 2 via a transmission cable 7.

(Outdoor Unit)

The outdoor unit 2 is installed outdoors, and configures part of the refrigerant circuit 10. The outdoor unit 2 mainly has a compressor 21, a four-way switching valve 22, an outdoor heat exchanger 23, a main valve 24, and a discharge-intake bypass circuit 26.

The compressor 21 is a machine for compressing low-pressure refrigerant in the refrigerating cycle to high pressure. The compressor 21 has an airtight structure in which a positive-displacement compression element in a rotary and/or scroll configuration (not illustrated) is driven to rotate by a compressor motor 21a capable of frequency control by an inverter. An intake pipe 31 is connected via an attached accumulator 21b to the intake side of the compressor 21, and a discharge pipe 32 is connected to the discharge side. The intake pipe 31 is a refrigerant pipe that connects the intake side of the compressor 21 and the four-way switching valve 22. The discharge pipe 32 is a refrigerant pipe that connects the discharge side of the compressor 21 and the four-way switching valve 22.

The four-way switching valve 22 is a switching valve for switching the direction of flow of the refrigerant in the refrigerant circuit 10. At times of running in cooling mode, the four-way switching valve 22 switches to a cooling cycle mode, prompting the outdoor heat exchanger 23 to function as a radiator for the refrigerant compressed in the compressor 21, and prompting the indoor heat exchanger 41 to function as an evaporator for the refrigerant that has released its heat in the indoor heat exchanger 23. Specifically, at times of running in cooling mode, the four-way switching valve 22 connects the discharge side of the compressor 21 (the discharge pipe 32 in the present embodiment) and the gas side of the outdoor heat exchanger 23 (the first gas refrigerant pipe 33 in the present embodiment) (see the four-way switching valve 22 solid lines in FIG. 1). The intake side of the compressor 21 (the intake pipe 31 in the present embodiment) and the gas refrigerant communication pipe 6 side (the second gas refrigerant pipe 34 in the present embodiment) are connected as well (see the four-way switching valve 22 solid lines in FIG. 1). At times of running in heating mode, the four-way switching valve 22 switches to a heating cycle mode, prompting the outdoor heat exchanger 23 to function as an evaporator for the refrigerant that has released its heat in the indoor heat exchanger 41, and the indoor heat exchanger 41 to function as a radiator for the refrigerant compressed in the compressor 21. Specifically, at times of running in heating mode, the four-way switching valve 22 connects the discharge side of the compressor 21 (the discharge pipe 32 in the present embodiment) and the gas refrigerant communication pipe 6 side (the second gas refrigerant pipe 34 in the present embodiment) (see the four-way switching valve 22 broken lines in FIG. 1). The intake side of the compressor 21 (the intake pipe 31 in the present embodiment) and the gas side of the outdoor heat exchanger 23 (the first gas refrigerant pipe 33 in the present embodiment) are connected as well (see the four-way switching valve 22 broken lines in FIG. 1). In the present embodiment, the first gas refrigerant pipe 33 is a refrigerant pipe that connects the four-way switching valve 22 and the gas side of the outdoor heat exchanger 23. The second gas refrigerant pipe 33 is a refrigerant pipe that connects the four-way switching valve 22 and the gas refrigerant communication pipe 6 side.

The outdoor heat exchanger 23 is a heat exchanger that, at times of running in cooling mode, functions as a radiator for refrigerant having the outdoor air as the cooling source, and at times of running in heating mode functions as an evaporator for refrigerant having the outdoor air as the heat source. The outdoor heat exchanger 23 is connected at the liquid side to the liquid refrigerant pipe 35, and at the gas side to the first gas refrigerant pipe 33. The liquid refrigerant pipe 35 is a refrigerant pipe that connects the liquid side of the outdoor heat exchanger 23 and the liquid refrigerant communication pipe 5 side.

The main valve 24 is a valve that, at times of running in cooling mode, depressurizes the refrigerant that has released its heat in the outdoor heat exchanger 23, and is at the high pressure level of the refrigerating cycle, and brings the refrigerant down to the low pressure level of refrigerating cycle. The main valve 24 is also a valve that, at times of running in heating mode, depressurizes the refrigerant which has released its heat in the indoor heat exchanger 41, and which is at the high pressure level of the refrigerating cycle, and brings the refrigerant down to the low pressure level of refrigerating cycle. The main valve 24 is disposed on the liquid refrigerant pipe 35. In the present embodiment, an electrically-powered expansion valve having a controllable valve opening is used as the main valve 24.

The discharge-intake bypass circuit 26 is a refrigerant pipe through which it is possible for the refrigerant to bypass from the discharge side of the compressor 21 to the intake side of the compressor 21 at times of running in heating mode. In the present embodiment, the discharge-intake bypass circuit 26 is disposed so as to branch off from the discharge pipe 32, and converge with the intake pipe 31. The discharge-intake bypass circuit 26 has a superheat valve 27. In the present embodiment, an electromagnetic valve in which opening and closing can be controlled is used as the superheat valve 27.

The outdoor unit 2 has an outdoor fan 25 for taking outside air into the outdoor unit 2, and after heat exchange with the refrigerant in the outdoor heat exchanger 23, venting the air to the outside. Specifically, the outdoor unit 2 has the outdoor fan 25 as a fan which supplies outdoor air to the outdoor heat exchanger 23, as a cooling source or a heat source for the refrigerant flowing through the outdoor heat exchanger 23. In the present embodiment, a propeller fan or the like driven by an outdoor fan motor 25a capable of rotation speed control may be used as the outdoor fan 25.

The outdoor unit 2 is furnished with sensors of various kinds. Specifically, the outdoor heat exchanger 23 is furnished with an outdoor heat exchange temperature sensor 53 for detecting the temperature Txo of the refrigerant in the outdoor heat exchanger 23. The outdoor unit 2 is also furnished with an outdoor temperature sensor 54 for detecting the temperature Toa of the intake of outside air into the outdoor unit 2. The discharge pipe 32 or the compressor 21 is furnished with a discharge temperature sensor 52 for detecting the temperature Td of the refrigerant at the high-pressure level of the refrigerating cycle being discharged from the compressor 21.

The outdoor unit 2 has an outdoor-side control unit 28 that controls the operation of the various parts constituting the outdoor unit 2. The outdoor-side control unit 28 has a microcomputer and/or a memory or the like, furnished for the purpose of controlling the outdoor unit 2, and is designed to be able to exchange control signals or the like with the indoor unit 4 via the transmission cable 7.

(Refrigerant Communication Pipes)

The refrigerant communication pipes 5, 6 are refrigerant pipes that are constructed on-site when the air conditioning device 1 is installed at a location such as a building; ones having various lengths and/or pipe diameters for the installation conditions, such as the installation location and the combination of outdoor units and indoor units, are used.

In the above manner, the refrigerant circuit 10 of the air conditioning device 1 is configured by connecting the outdoor unit 2, the indoor unit 4, and the refrigerant communication pipes 5, 6. Here, the refrigerant circuit 10 is configured by connecting the discharge-intake bypass circuit 26 having the superheat valve 27, to a main refrigerant circuit 11 having mainly the compressor 21, the indoor heat exchanger 41, the main valve 24, and the outdoor heat exchanger 23 (the section of the refrigerant circuit 10 excluding the discharge-intake bypass circuit 26) By switching the four-way switching valve 22 to the heating cycle mode in the manner discussed below, it is possible for the main refrigerant circuit 11 of the refrigerant circuit 10 to be operated in heating mode to circulate the refrigerant in order through the compressor 21, the indoor heat exchanger 41, the main valve 24, and the outdoor heat exchanger 23.

(Control Unit)

The air conditioning device 1 is designed such that control of the various equipment of the outdoor unit 2 and the indoor unit 4 can be carried out by a control unit 8 constituted by the indoor-side control unit 43 and the outdoor-side control unit 28. Specifically, the control unit 8 for controlling the running of the entire air conditioning device 1, including running in heating mode and the like, is configured by the transmission cable 7 connecting the indoor-side control unit 43 and the outdoor-side control unit 28.

Figure 2:
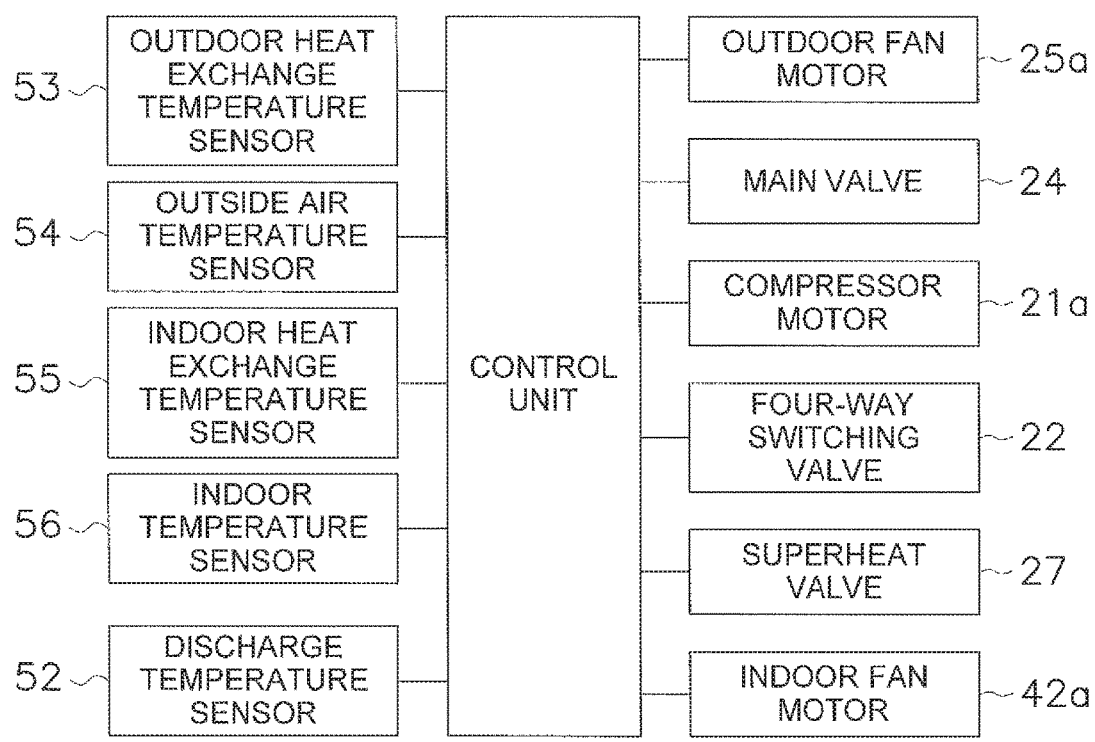
FIG. 2 is a control block diagram of an air conditioning device.

As shown in FIG. 2, the control unit 8 is connected so as to be able to receive detection signals from the various sensors 52-56, and is connected to as to be able to control various equipment and valves 21a, 22, 24, 25a, 27, 42a, and the like on the basis of these detection signals and the like.

(2) Operation of Air Conditioning Device

Next, the operation of the air conditioning device 1 will be described using FIGS. 3 to 6. It is possible for the air conditioning device 1 to be run in cooling mode (see FIG. 3) and in heating mode (see FIG. 4). At times of running in heating mode, it is possible to also run in positive cycle defrost mode (see FIGS. 5 and 6) in order to melt frost which has become deposited on the outdoor heat exchanger 23.

(Running in Cooling Mode)

Figure 3:
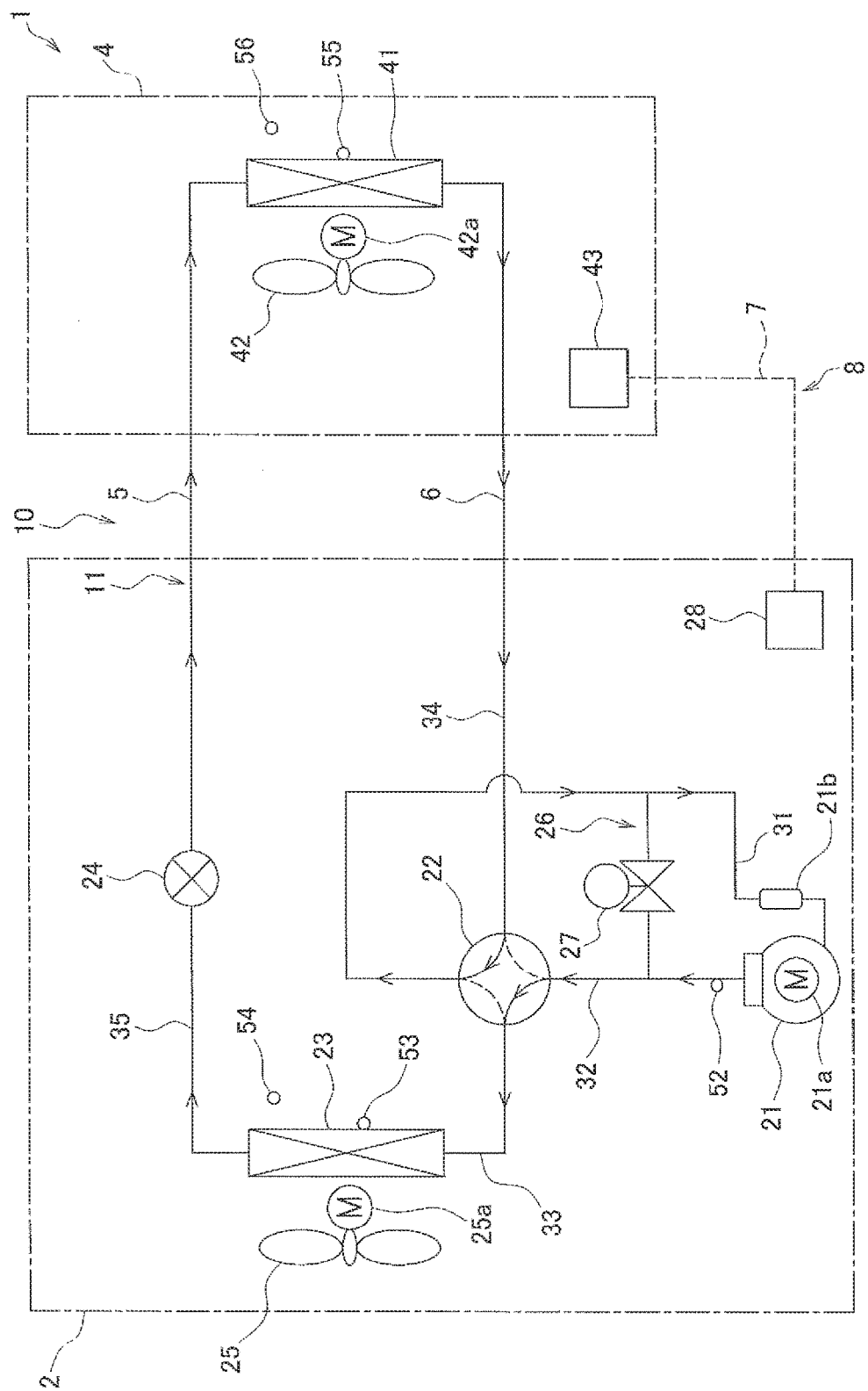
FIG. 3 is a diagram showing behavior (flow of refrigerant) at times of running in cooling mode.

At times of running in cooling mode, the four-way switching valve 22 is switched to the cooling cycle mode (the mode shown by solid lines in FIG. 3). The superheat valve 27 of the discharge-intake bypass circuit 26 is closed.

In the refrigerant circuit 10, the gas refrigerant at the low-pressure level of the refrigerating cycle is taken into the compressor 21, and discharged after being compressed to the high-pressure level of the refrigerating cycle.

The high-pressure gas refrigerant discharged from the compressor 21 is fed to the outdoor heat exchanger 23 through the four-way switching valve 22.

In the outdoor heat exchanger 23, the high-pressure gas refrigerant fed to the outdoor heat exchanger 23 releases heat while undergoing heat exchange with outdoor air supplied as a cooling source by the outdoor fan 36, and becomes high-pressure liquid refrigerant.

The high-pressure liquid refrigerant having released its heat in the outdoor heat exchanger 23 is fed to the main valve 24.

The high-pressure liquid refrigerant fed to the main valve 24 is depressurized to the low-pressure level of the refrigerating cycle by the main valve 24, and becomes refrigerant in a low-pressure, gas-liquid two-phase state. The refrigerant in the low-pressure, gas-liquid two-phase state depressurized by the main valve 24 is fed to the indoor heat exchanger 41 through the liquid refrigerant communication pipe 5.

In the indoor heat exchanger 41, the refrigerant in the low-pressure, gas-liquid two-phase state fed to the indoor heat exchanger 41 evaporates while undergoing heat exchange with indoor air supplied as a heat source by the indoor fan 42. In so doing, the indoor air is cooled, and thereafter supplied to the indoors in order to cool the indoors.

The low-pressure gas refrigerant evaporated in the indoor heat exchanger 41 is again taken into the compressor 21 through the gas refrigerant communication pipe 6 and the four-way switching valve 22.

In this way, running in cooling mode to circulate the refrigerant in order through the compressor 21, the outdoor heat exchanger 23, the main valve 24, and the indoor heat exchanger 41 is carried out in the refrigerant circuit 10 (the main refrigerant circuit 11 in the present embodiment).

(Running in Heating Mode)

Figure 4:
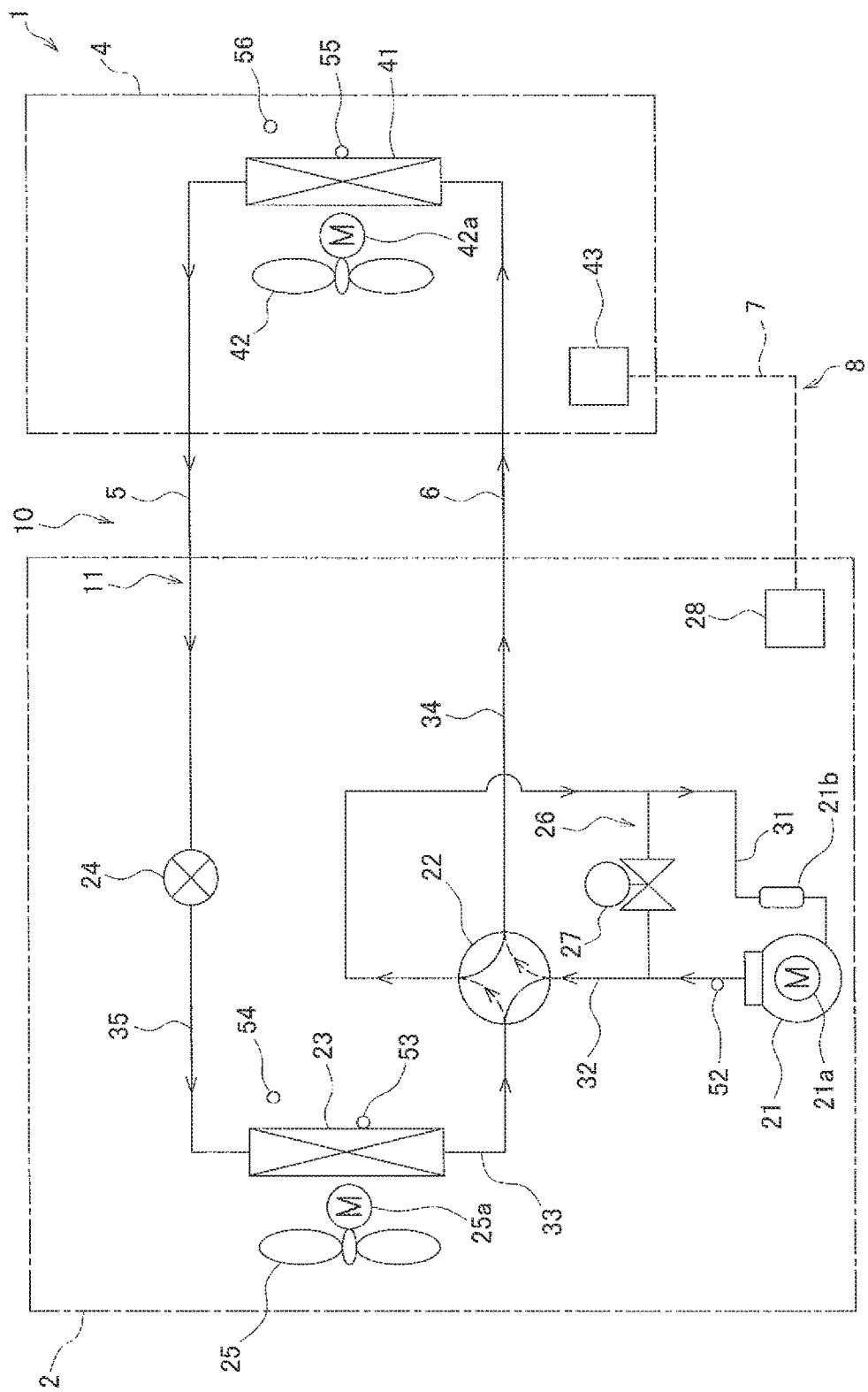
FIG. 4 is a diagram showing behavior (flow of refrigerant) at times of running in heating mode.

At times of running in heating mode, the four-way switching valve 22 is switched to the heating cycle mode (the mode shown by broken lines in FIG. 4).

In the refrigerant circuit 10, the gas refrigerant at the low-pressure level of the refrigerating cycle is taken into the compressor 21, and after being compressed to the high-pressure level of the refrigerating cycle, is discharged.

The high-pressure gas refrigerant discharged from the compressor 21 is fed to the indoor heat exchanger 41 through the four-way switching valve 22 and the gas refrigerant communication pipe 6.

In the indoor heat exchanger 41, the high-pressure gas refrigerant fed to the indoor heat exchanger 41 releases heat while undergoing heat exchange with indoor air supplied as a cooling source by the indoor fan 42, and becomes high-pressure liquid refrigerant. The indoor air is heated thereby, and is then supplied to the indoors to carry out indoor heating.

The high-pressure liquid refrigerant having released its heat in the indoor heat exchanger 41 is fed to the main valve 24 through the liquid refrigerant communication pipe 5.

The high-pressure liquid refrigerant fed to the main valve 24 is depressurized to the low-pressure level of the refrigerating cycle by the main valve 24, and becomes refrigerant in a low-pressure, gas-liquid two-phase state. The refrigerant in the low-pressure, gas-liquid two-phase state depressurized by the main valve 24 is fed to the outdoor heat exchanger 23.

In the outdoor heat exchanger 23, the refrigerant in the low-pressure, gas-liquid two-phase state fed to the outdoor heat exchanger 23 evaporates while undergoing heat exchange with outdoor air supplied as a heat source by the outdoor fan 25, and becomes low-pressure gas refrigerant.

The low-pressure gas refrigerant evaporated in the outdoor heat exchanger 23 is again taken into the compressor 21 through the four-way switching valve 22.

In this way, running in heating mode to circulate the refrigerant in order through the compressor 21, the indoor heat exchanger 41, the main valve 24, and the outdoor heat exchanger 23 is carried out in the refrigerant circuit 10 (the main refrigerant circuit 11 in the present embodiment).

(Running in Positive Cycle Defrosting Mode)
(Basic Operation)

During running in the aforedescribed heating mode, in cases in which frost in the outdoor heat exchanger 23, caused by the temperature Txo of the refrigerant in the outdoor heat exchanger 23 falling below a predetermined temperature or the like, has been detected, the system runs in a positive cycle defrosting mode to melt the frost deposited on the outdoor heat exchanger 23, and returns to running in heating mode once the frost deposited on the outdoor heat exchanger 23 has been melted. In the present embodiment, melting of frost deposited on the outdoor heat exchanger 23 has melted is detected when the temperature Txo of the refrigerant in the outdoor heat exchanger 23 rises above a predetermined temperature.

Figure 5:
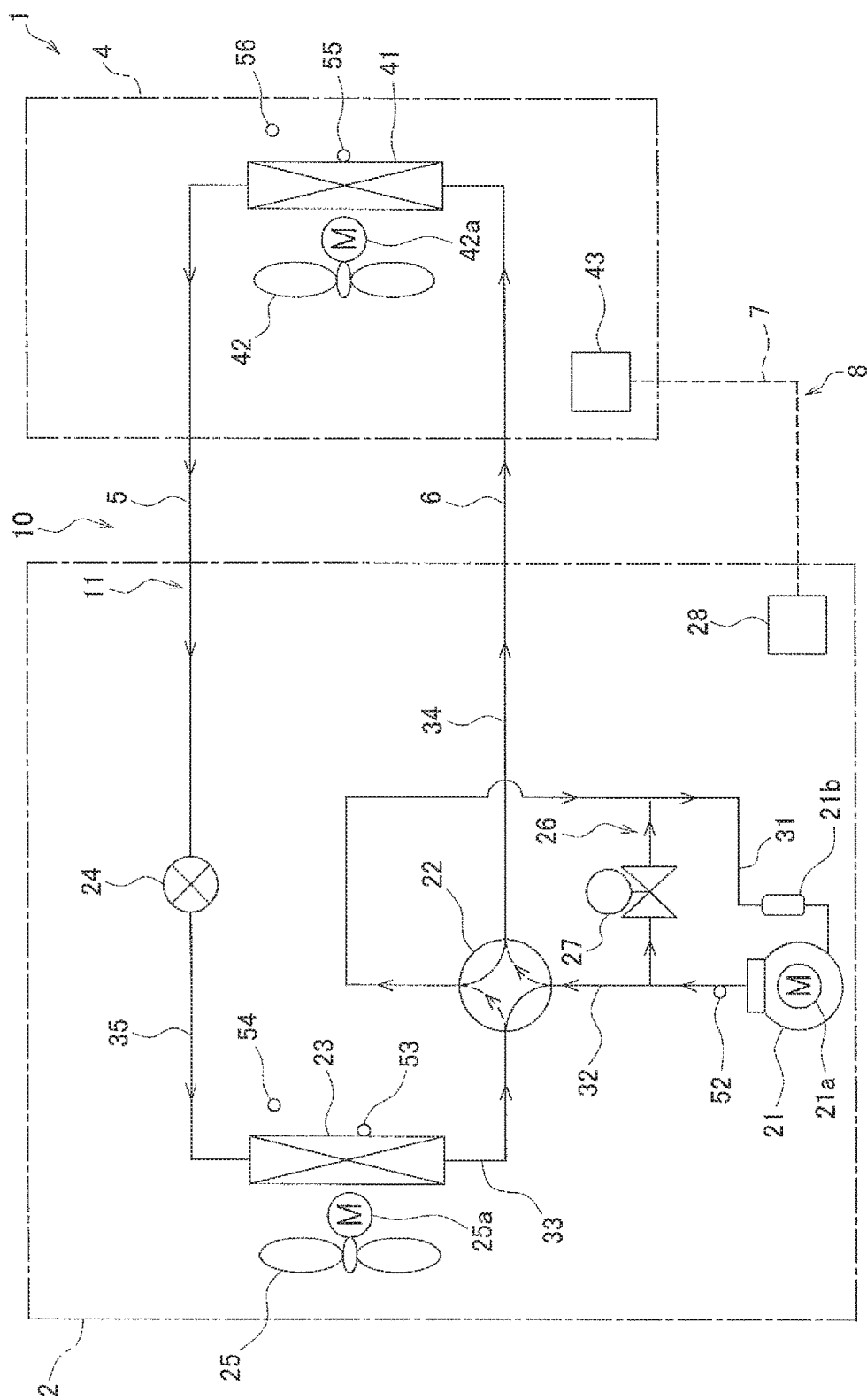
FIG. 5 is a diagram showing behavior (flow of refrigerant) at s of running in positive cycle defrosting mode.
Figure 6:
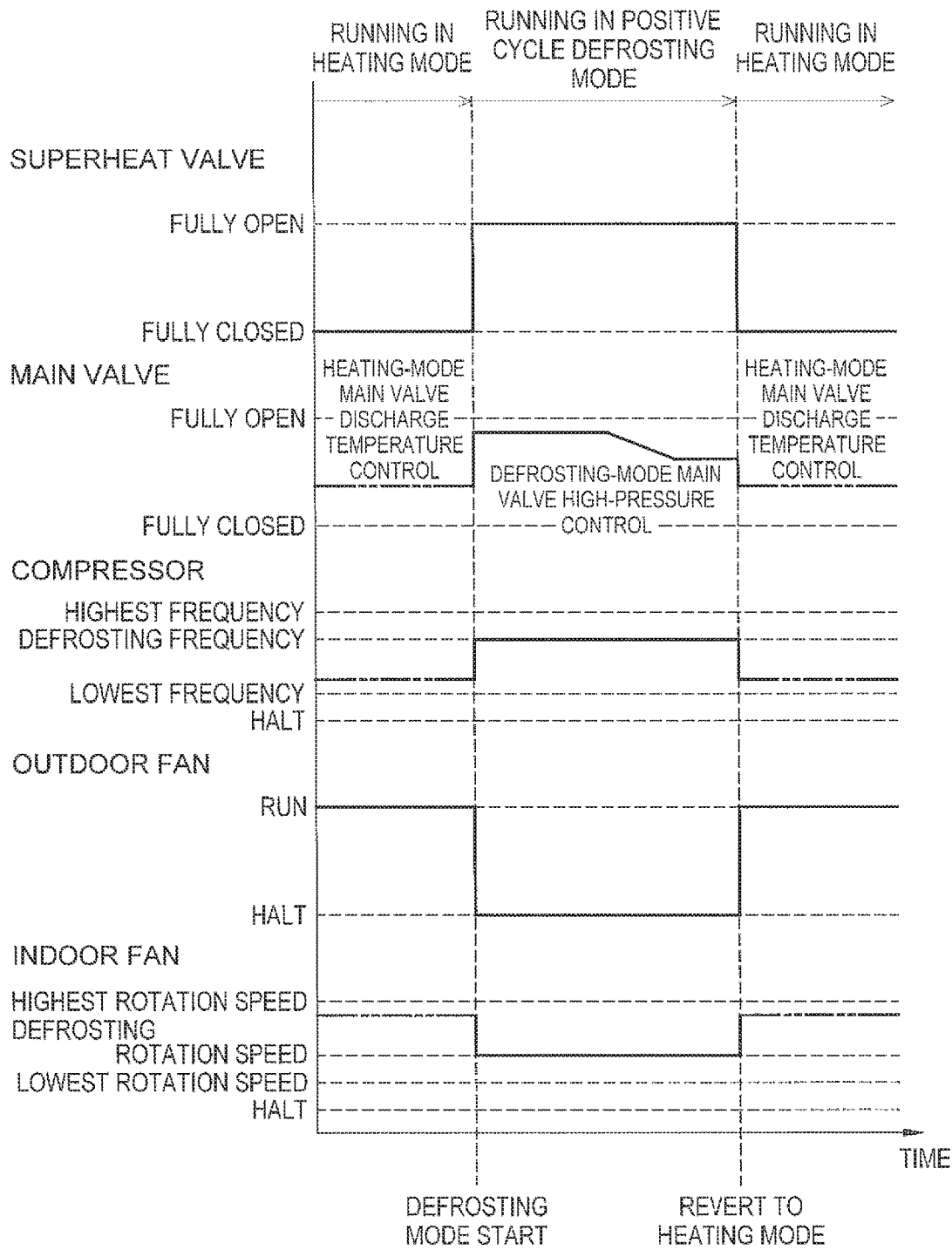
FIG. 6 is a time chart showing behavior of a superheat valve, a main valve, a compressor, an outdoor fan, and an indoor fan at times of running in positive cycle defrosting mode and in heating mode before and after.

Running in the positive cycle defrosting mode here refers to running to defrost the outdoor heat exchanger 23 while circulating the refrigerant in the same manner as during running in heating mode, specifically, in order through the compressor 21, the indoor heat exchanger 41, the main valve 24, and the outdoor heat exchanger 23, in the main refrigerant circuit 11 of the refrigerant circuit 10 with the four-way switching valve 22 in the heating cycle mode depicted by broken lines in FIG. 5.

However, when running in the positive cycle defrosting mode, unlike when running in heating mode, the superheat valve 27 of the discharge-intake bypass circuit 26 is opened, and an operation is carried out to cause the refrigerant to bypass from the discharge side of the compressor 21 to the intake side of the compressor 21 through the discharge-intake bypass circuit 26.

In specific terms, in the refrigerant circuit 10, gas refrigerant at the low pressure level of the refrigerating cycle is taken into the compressor 21, and discharged after being compressed to the high pressure level of the refrigerating cycle.

A portion of the high-pressure gas refrigerant discharged from the compressor 21 is caused to bypass to the intake side of the compressor 21 through the discharge-intake bypass circuit 26, while the remainder of the gas refrigerant is fed to the indoor heat exchanger 41 through the four-way switching valve 22 and the gas refrigerant communication pipe 6.

In the indoor heat exchanger 41, the high-pressure gas refrigerant fed to the indoor heat exchanger 41 releases heat while undergoing heat exchange with indoor air supplied as a cooling source by the indoor fan 42. The indoor air is heated thereby, and is then supplied to the indoors, so that heating of the indoors subsequently continues to be carried out even during the defrosting process.

The high-pressure refrigerant having released its heat in the indoor heat exchanger 41 is fed to the outdoor heat exchanger 23 through the liquid refrigerant communication pipe 5 and the main valve 24.

In the outdoor heat exchanger 23, the refrigerant fed to the outdoor heat exchanger 23 releases its heat while undergoing heat exchange with frost deposited in the outdoor heat exchanger 23, and enters a gas-liquid two-phase state containing a large amount of liquid refrigerant. The frost deposited in the outdoor heat exchanger 23 is melted thereby, and defrosting of the outdoor heat exchanger 23 takes place.

The refrigerant in a gas-liquid two-phase state containing liquid refrigerant, having released its heat in the outdoor heat exchanger 23, is fed to the intake pipe 31 through the four-way switching valve 22, and converges with the gas refrigerant having bypassed to the intake side of the compressor 21 through the discharge-intake bypass circuit 26, thereby entering a gas state or a gas-liquid two-phase state containing a small amount of liquid refrigerant, and is again taken into the compressor 21.

In this way, in the refrigerant circuit 10, the refrigerant is circulated in order through the compressor 21, the indoor heat exchanger 41, the main valve 24, and the outdoor heat exchanger 23, while opening the superheat valve 27 and running the system in the positive cycle defrosting mode to cause refrigerant to bypass from the discharge side of the compressor 21 to the intake side of the compressor 21 through the discharge-intake bypass circuit 26.

(Control)

At times of running in the positive cycle defrosting mode, just as in a conventional system, once the main valve 24 has opened to the nearly fully-open position, it is difficult for the high pressure level of the refrigerating cycle to rise sufficiently, and there is a tendency to fall into a vicious cycle whereby the power input to the compressor 21 declines, as a result of which the quantity of heat that can be used for defrosting declines, liquid backflow into the compressor 21 increases, the high pressure level of the refrigerating cycle decreases further, and power input to the compressor decreases, There is a risk that, at some point, the positive cycle defrosting mode can no longer continue, due to this vicious cycle.

Accordingly, in the present embodiment, defrosting-mode main valve high-pressure control for adjusting the valve opening of the main valve 24 is performed so as to bring the high-pressure Ph level of the refrigerating cycle in the main refrigerant circuit 11 to a target high pressure Phs level. Control of various items of equipment, including during running in the positive cycle defrosting mode and running in heating mode therebefore and thereafter, is described below using the time chart of running in the positive cycle defrosting mode and running in heating mode therebefore and thereafter shown in FIG. 6.

First, with the system running in heating mode before running in the positive cycle defrosting mode has started, as described above, the superheat valve 27 is fully closed, and the main valve 24, the compressor 21, the outdoor fan 25, and the indoor fan 42 are controlled, for example, such that the temperature Tra of the indoor air detected by the indoor temperature sensor 56 is at a target indoor temperature. In the present embodiment, by way of control of the main valve 24 while running in heating mode, heating-mode main valve discharge temperature control to adjust the valve opening of the main valve 24 is carried out on the basis of the temperature Td of the refrigerant at the discharge side of the compressor 21. In specific terms, control is carried out to adjust the valve opening of the main valve 24 such that the temperature Td of the refrigerant at the discharge side of the compressor 21 is brought to a target discharge temperature Tds. Specifically, in cases in which the temperature Td of the refrigerant is lower than the target discharge temperature Tds, control to make the valve opening of the main valve 24 smaller is performed, and in cases in which the temperature Td of the refrigerant is higher than the target discharge temperature Tds, control to make the valve opening of the main valve 24 larger is performed.

Next, when frost is detected in the outdoor heat exchanger 23, the positive cycle defrosting mode starts. When running in the positive cycle defrosting mode, an operation to fully open the superheat valve 27, causing refrigerant to bypass from the discharge side of the compressor 21 to the intake side of the compressor 21 through the discharge-intake bypass circuit 26 in the aforedescribed manner, is carried out. Moreover, by way of control of the main valve 24 while running in the positive cycle defrosting mode, the aforedescribed defrosting-mode main valve high-pressure control is carried out instead of heating-mode main valve discharge temperature control. In specific terms, the temperature Txi of the refrigerant detected by the indoor heat exchange temperature sensor 55 corresponds to the saturation temperature of the refrigerant at the high-pressure Ph level of the refrigerating cycle, and therefore using the temperature Txi of the refrigerant as the high-pressure Ph level of the refrigerating cycle, control is carried out to adjust the valve opening of the main valve 24 so that this high-pressure Ph level is brought to the target high pressure Phs level. Specifically, in cases in which the high-pressure Ph level is lower than the target high pressure Phs level, control to make the valve opening of the main valve 24 smaller is performed, and in cases in which the high-pressure Ph level is higher than the target high pressure Phs level, control to make the valve opening of the main valve 24 larger is performed. Here, the target high pressure Phs level is set to a value close to the upper limit Phx of the high pressure Ph level during running in heating mode. This upper limit Phx of the high pressure Ph level is a value that is specified with consideration to the design pressures of the equipment constituting the refrigerant circuit 10 and the like, the target high pressure Phs level being a pressure value somewhat lower than this value. The compressor 21 is run at a defrosting frequency that is a frequency used when running in the positive cycle defrosting mode. In the present embodiment, the defrosting frequency is set to a high frequency close to the highest frequency. The outdoor fan 25 is halted. Further, the indoor fan 42 is run at a defrosting rotation speed which is a rotation speed used when running in the positive cycle defrosting mode. In the present embodiment, the defrosting rotation speed is set to the lowest rotation speed, or a low rotation speed close to the lowest rotation speed.

When the frost deposited on the outdoor heat exchanger 23 is detected to have melted, the positive cycle defrosting mode terminates, and the system reverts to running in heating mode. In specific terms, the superheat valve 26 is fully closed, control of the main valve 24 reverts from defrosting-mode main valve high-pressure control to heating-mode main valve discharge temperature control, and control of the compressor 21, the outdoor fan 25, and the indoor fan 42 returns to the specifics of control during running in heating mode.

In this way, in the refrigerant circuit 10 (the main refrigerant circuit 11 in the present embodiment), defrosting-mode main valve high-pressure control to adjust the valve opening of the main valve 24 so that the high-pressure Ph level of the refrigerating cycle in the main refrigerant circuit 11 is brought to the target high pressure Phs level is carried out when the system is running in positive cycle defrosting mode.

(Features)

Running in the positive cycle defrosting mode has the following features.

In the present embodiment, as described above, while running in the positive cycle defrosting mode, the valve opening of the main valve 24 is adjusted such that the high-pressure Ph level of the refrigerating cycle is brought to the target high pressure Phs level (defrosting-mode main valve high-pressure control). For this reason, the high-pressure Ph level of the refrigerating cycle can be maintained near the desired target high pressure Phs level while running in the positive cycle defrosting mode. In so doing, the power input to the compressor 21 is increased, as a result of which a quantity of heat that can be used for defrosting is ensured, and the system can continue to run in the positive cycle defrosting mode.

Because the target high pressure Phs is set to near the upper limit Phx of the high-pressure Ph level of the refrigerating cycle while running in heating mode in the aforedescribed manner, the high-pressure Ph level of the refrigerating cycle can be maintained at a sufficiently high level while running in the positive cycle defrosting mode. In so doing, the quantity of heat that can be used for defrosting can be greatly increased during running in the positive cycle defrosting mode.

Additionally, because the high-pressure Ph level of the refrigerating cycle is obtained by the indoor heat exchange temperature sensor 55 in the aforedescribed manner, there is no need to furnish a pressure sensor to obtain the high-pressure Ph level of the refrigerating cycle.

Moreover, as described above, the valve opening of the main valve 24, while running in heating mode, is controlled on the basis of the temperature Td of the refrigerant at the discharge side of the compressor 21 (heating-mode main valve discharge temperature control), and while running in the positive cycle defrosting mode, is controlled such that the high-pressure Ph level of the refrigerating cycle is brought to the target high pressure Phs level (defrosting-mode main valve high-pressure control). In so doing, the system can switch to appropriate valve opening control of the main valve 24, depending on specific running conditions.

(3) Modification 1

Figure 7:
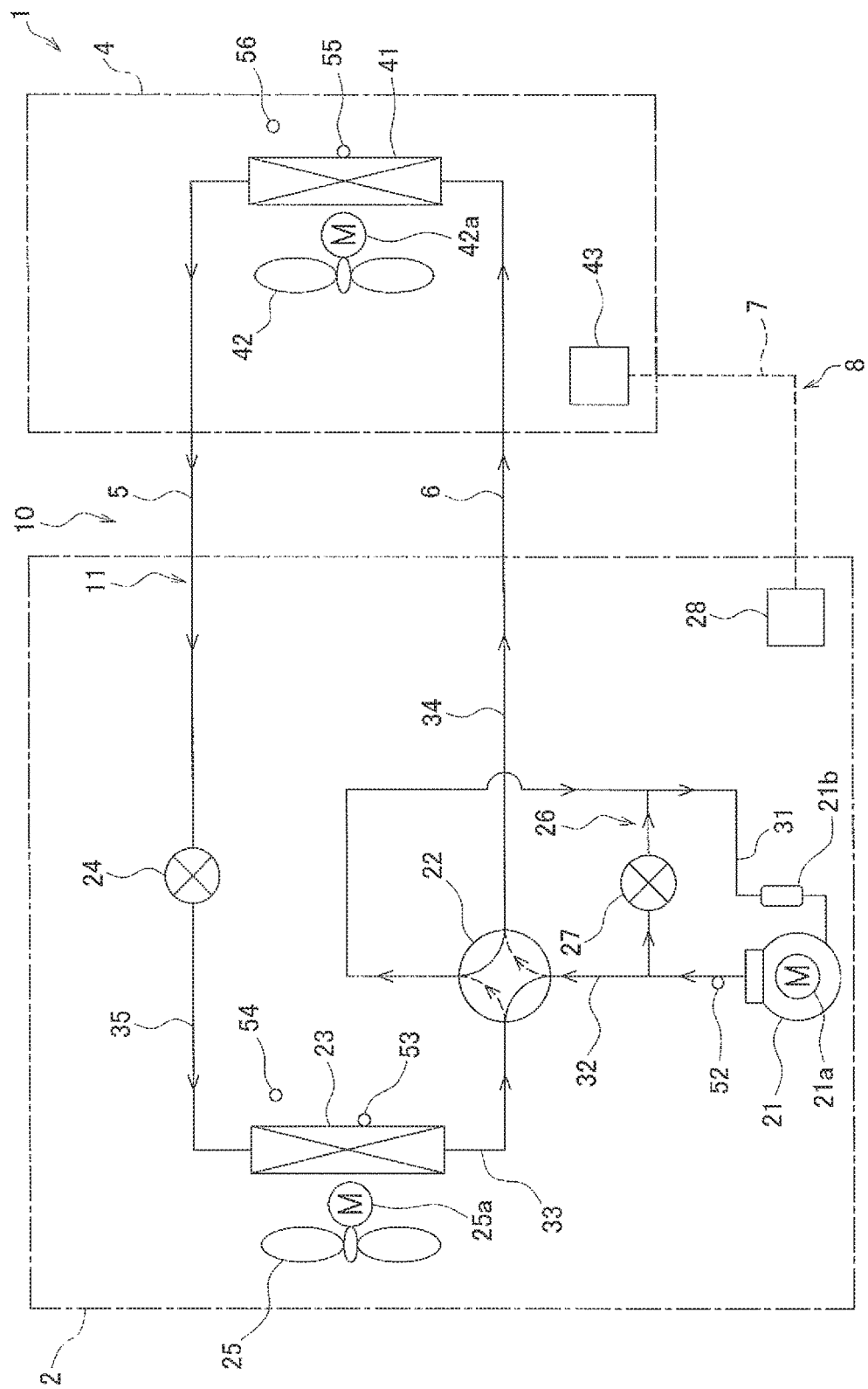
FIG. 7 is a simplified schematic diagram of an air conditioning device according to Modifications 1 to 4 of the present invention (also depicting flow of refrigerant at times of running in positive cycle defrosting mode)

In the embodiment above, an electromagnetic valve or other such valve capable of on-off control is used as the superheat valve 27 of the discharge-intake bypass circuit 26, but it would be acceptable to instead use an electrically powered expansion valve or other such valve capable of on-off control, as shown in FIG. 7. In this case as well, running in the positive cycle defrosting mode can be carried out in the same fashion as in the aforedescribed embodiment.

Here, utilizing the feature of using a valve capable of on-off control as the superheat valve 27, when running in the positive cycle defrosting mode, defrosting-mode main valve high-pressure control carried out by the main valve 24 may be accompanied by defrosting-mode discharge temperature control carried out to adjust the valve opening of the superheat valve 27 in such a way that the degree of superheat TdSH of the refrigerant at the discharge side of the compressor 21 is brought to a target discharge degree of superheat TdSHs. In specific terms, the refrigerant temperature at the discharge side of the compressor 21 is obtained from the refrigerant temperature Td detected by the discharge temperature sensor 52 furnished at the discharge side of the compressor 21, the refrigerant saturation temperature at the discharge side of the compressor 21 is obtained from the refrigerant temperature Txi detected by the indoor heat exchange temperature sensor 55 furnished to the indoor heat exchanger 41, and the degree of superheat TdSH of the refrigerant at the discharge side of the compressor 21 is obtained from these two refrigerant temperatures Td and Txi. Here, the degree of superheat TdSH is obtained by subtracting the refrigerant temperature Txi from the refrigerant temperature Td. Control is then carried out to adjust the degree of opening of the superheat valve 27 such that the degree of superheat TdSH equals the target discharge degree of superheat TdSHs. Specifically, in cases in which the degree of superheat TdSH is lower than the target discharge degree of superheat TdSHs, control is performed to enlarge the valve opening of the superheat valve 27, and in cases in which the degree of superheat TdSH is higher than the target discharge degree of superheat TdSHs, control is performed to reduce the valve opening of the superheat valve 27. Here, in consideration of the reliability of the compressor 21, the target discharge degree of superheat TdSH is set to a value of about 5-15 deg. Control of other equipment (the main valve 24, the compressor 21, the outdoor fan 25, and the indoor fan 42) while running in the positive cycle defrosting mode is the same as in the aforedescribed embodiment.

In the present modification, when the system is running in the positive cycle defrosting mode, the degree of opening of the superheat valve 27 is adjusted to bring the degree of superheat TdSH of the refrigerant at the discharge side of the compressor 21 to the target discharge degree of superheat TdSHs (defrosting-mode discharge temperature control) in the aforedescribed manner. For this reason, both excessive liquid backflow to the compressor 21, and seizing up and/or damage to the compressor 21 occurring due to a state of excessive superheat of the refrigerant intake to the compressor 21 can be minimized while running in the positive cycle defrosting mode. In so doing, the reliability of the compressor while running in the positive cycle defrosting mode can be ensured.

(4) Modification 2

In the aforedescribed embodiment and Modification 1, the outdoor fan 25 is always halted while the system is running in the positive cycle defrosting mode; however, it would be acceptable to run the outdoor fan 25 depending on running conditions while running in the positive cycle defrosting mode.

Figure 8:
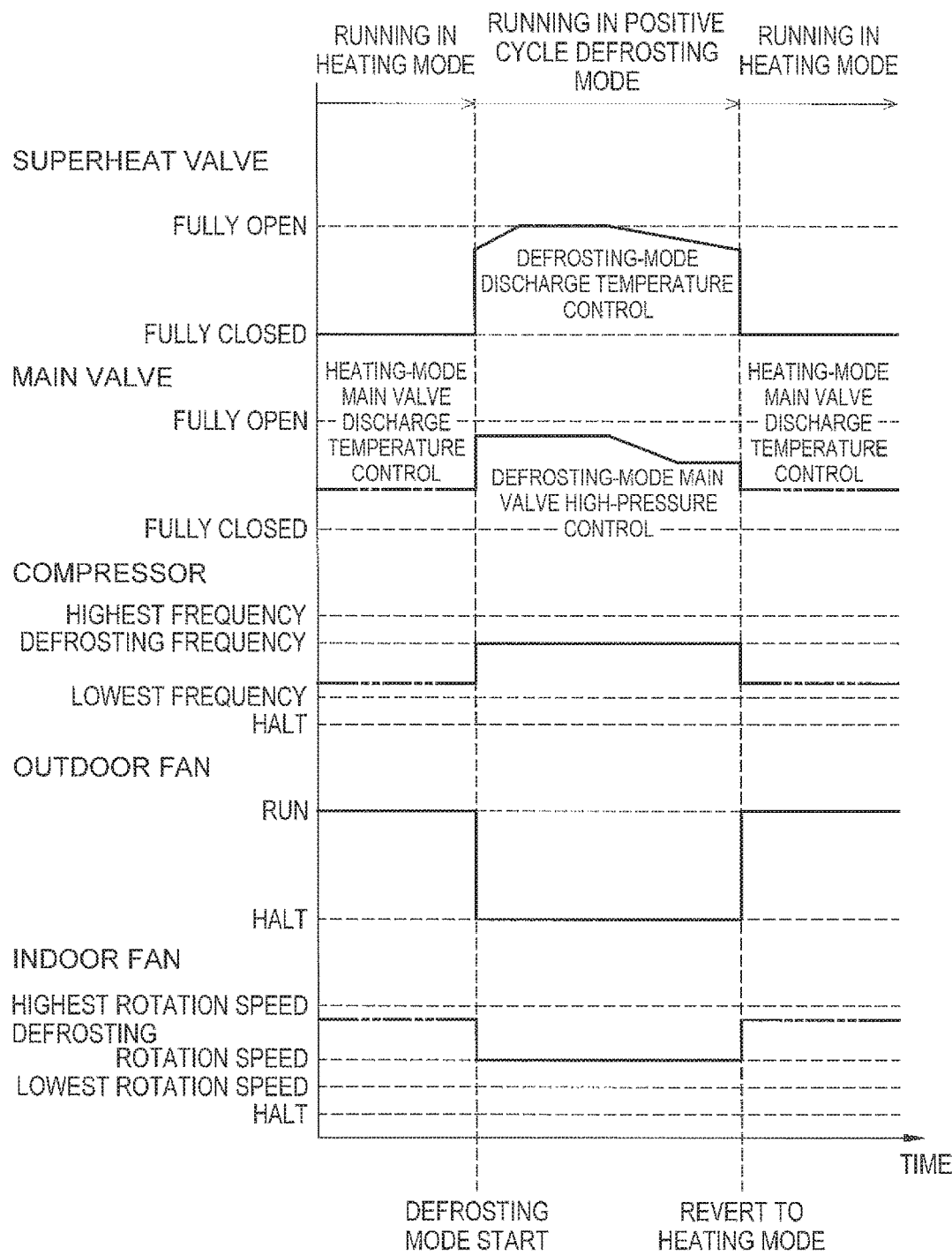
FIG. 8 is a time chart showing behavior of a superheat valve, a main valve, a compressor, an outdoor fan, and an indoor fan at times of running in positive cycle defrosting mode and in heating mode before and after, in Modification 1 of the present invention.
Figure 9:
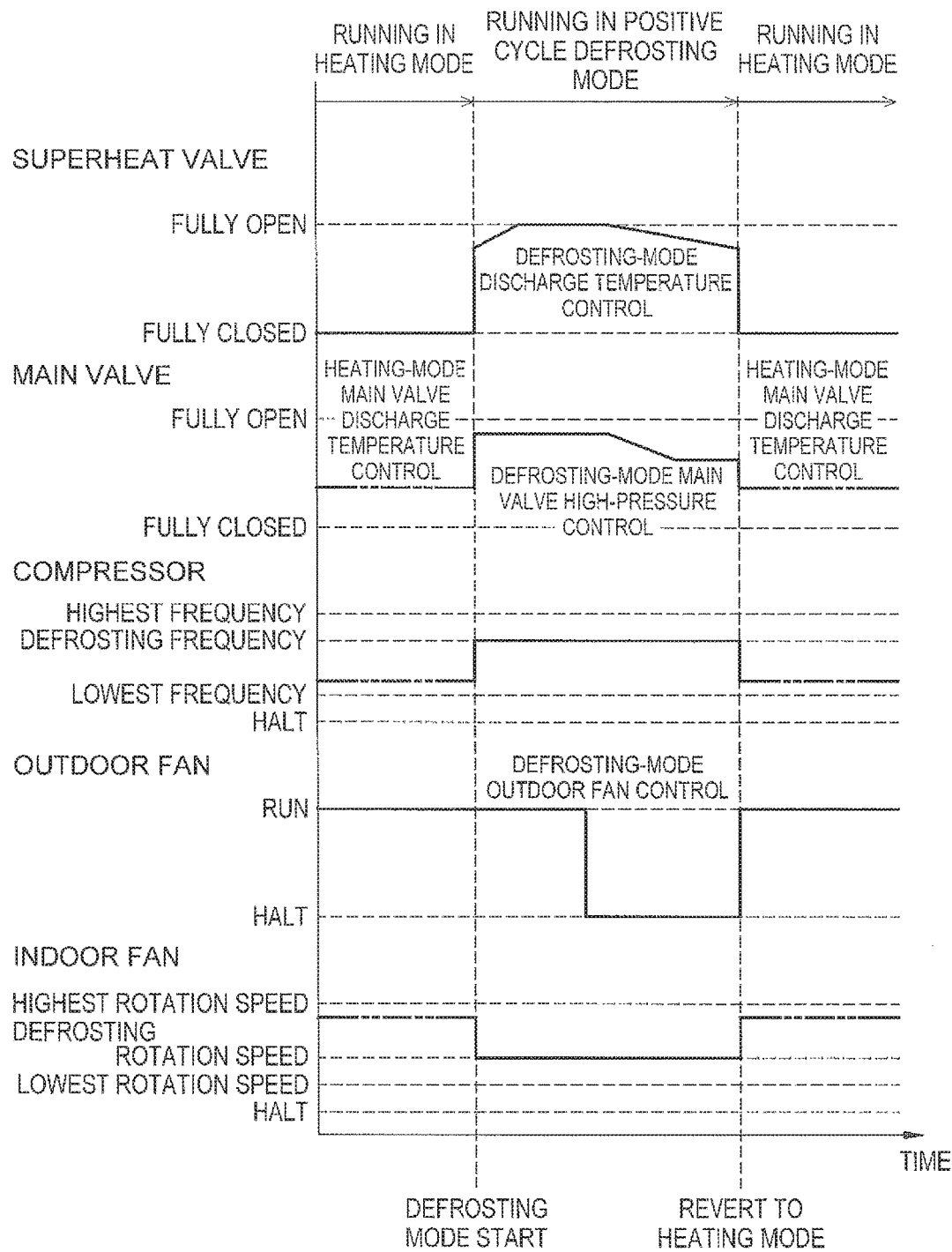
FIG. 9 is a time chart showing behavior of a superheat valve, a main valve, a compressor, an outdoor fan, and an indoor fan at times of running in positive cycle defrosting mode and in heating mode before and after, in Modification 2 of the present invention.

For example, as shown in FIG. 9, while running in the positive cycle defrosting mode, it would be acceptable to carry out defrosting-mode outdoor fan control to run the outdoor fan 25 in cases in which the refrigerant temperature Txo detected by the outdoor heat exchange temperature sensor 53 furnished to the outdoor heat exchanger 23 has not risen to a fan stop temperature Tfs equal to a value close to the outside air temperature, and to halt the outdoor fan 25 in cases in which the temperature has risen to the fan stop temperature Tfs. Here, the fan stop temperature Tfs is set to a value within about ±2 deg. from the outside air temperature Toa detected by the outside air temperature sensor 54. Control of other equipment (the superheat valve 27, the main valve 24, the compressor 21, and the indoor fan 42) when running in the positive cycle defrosting mode is the same as in the aforedescribed embodiment and Modification 1. While FIG. 9 depicts the application of the defrosting-mode outdoor fan control to running in positive cycle defrosting mode in Modification 1 (see FIG. 8), the defrosting-mode outdoor fan control could be applied to running in positive cycle defrosting mode in the aforedescribed embodiment (see FIG. 6).

In the present modification, rather than always halting the outdoor fan 25 during running in the positive cycle defrosting mode, control is carried out in the aforedescribed manner, to run the outdoor fan 25 until the refrigerant temperature Txo in the outdoor heat exchanger 23 rises to near the outside air temperature Toa (here, the fan stop temperature Tfs), and then halt the outdoor fan 25 (defrosting-mode outdoor fan control), For this reason, while the outdoor fan 25 is running, the outdoor heat exchanger 23 can be defrosted using the quantity of heat afforded by power input to the compressor 21 and the quantity of heat afforded by heat exchange. In so doing, the defrosting time during running in the positive cycle defrosting mode can be shorter.

(5) Modification 3

In the aforedescribed Modifications 1 and 2, switching of control of the main valve 24 and the superheat valve 27 is carried out at the start time of the positive cycle defrosting mode and/or the time of reverting from the positive cycle defrosting mode to the heating mode, and at these times it is preferable for transient pressure fluctuations in the refrigerant circuit 10 to be prevented from occurring, to the greatest extent possible.

Figure 10:
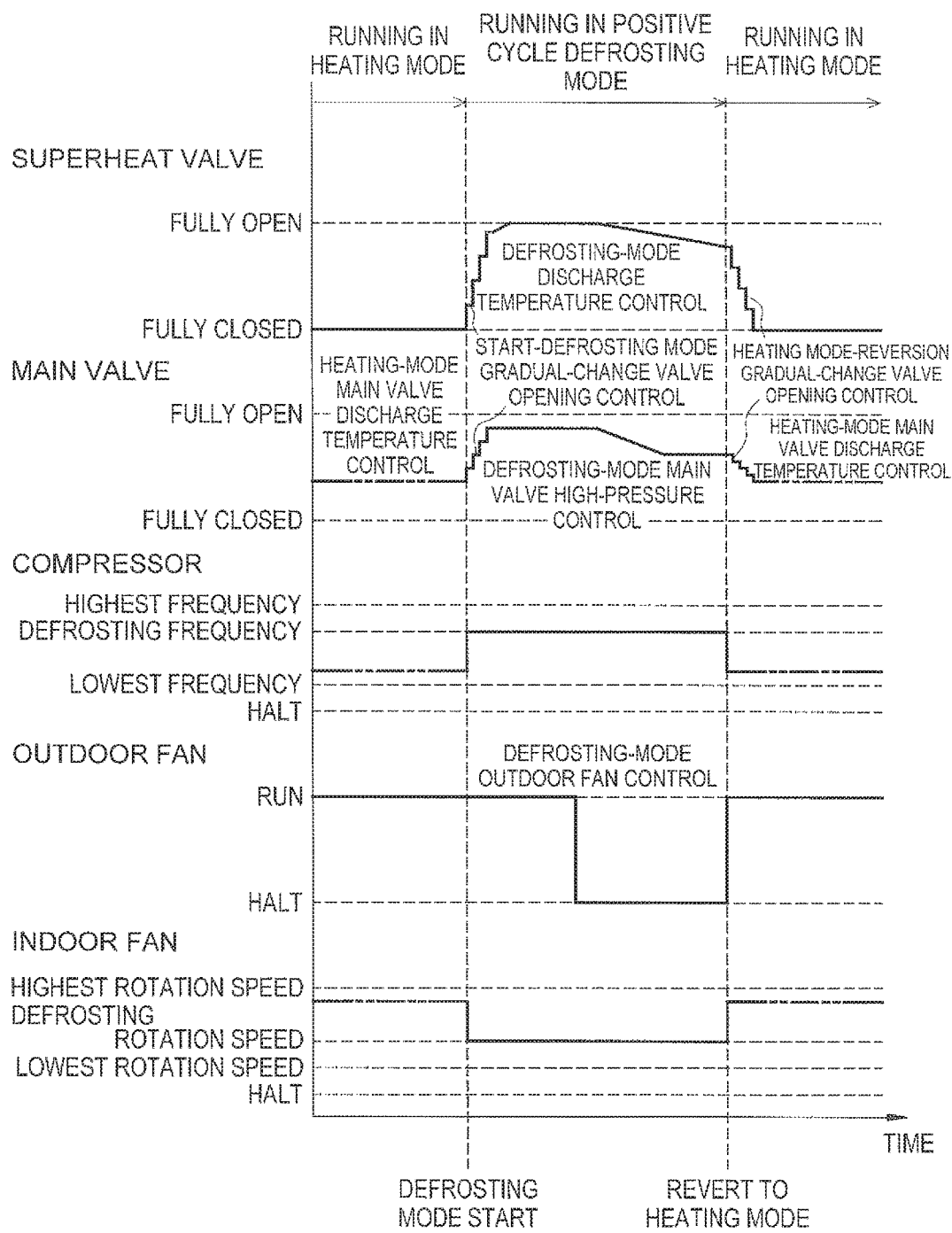
FIG. 10 is a time chart showing behavior of a superheat valve, a main valve, a compressor, an outdoor fan, and an indoor fan at times of running in positive cycle defrosting mode and in heating mode before and after, in Modification 3 of the present invention.

Thus, as shown in FIG. 10, at the time that the positive cycle defrosting mode starts and/or at the time of reverting from the positive cycle defrosting mode to the heating mode, start-defrosting mode gradual-change valve opening control and/or heating mode-reversion gradual-change valve opening control may be carried out for the purpose of gradually changing the valve opening of the main valve 24 and the superheat valve 27. In specific terms, at the start of the positive cycle defrosting mode, start-defrosting mode gradual-change valve opening control is carried out to gradually change the valve opening of the superheat valve 27 in several stages of 10 seconds to several tens of seconds during switching of the fully-closed superheat valve 27 to defrosting-mode discharge temperature control, until the initial target valve opening for defrosting-mode discharge temperature control is reached, as well as to gradually change the valve opening of the main valve 24 in several stages of 10 seconds to several tens of seconds during switching of the main valve 24 from heating-mode main valve discharge temperature control to defrosting-mode main valve high-pressure control, until the initial target valve opening for defrosting-mode main valve high-pressure control is reached. When reverting from the positive cycle defrosting mode to the heating mode, heating mode-reversion gradual-change valve opening control is carried out to gradually change the valve opening of the superheat valve 27 to the fully closed position as the target valve opening, doing no in several stages of 10 seconds to several tens of seconds, during switching of the superheat valve 27 from defrosting-mode discharge temperature control to the fully closed position, and to gradually change the valve opening of the main valve 24 to the initial target valve opening for heating-mode main valve discharge temperature control, doing so in several stages of 10 seconds to several tens of seconds, during switching of the main valve 24 from defrosting-mode main valve high-pressure control to heating-mode main valve discharge temperature control. Control of other equipment (the compressor 21, the outdoor fan 25, and the indoor fan 42) when running in the positive cycle defrosting mode is the same as in Modifications 1 and 2. While FIG. 10 depicts application of start-defrosting mode gradual-change valve opening control and heating mode-reversion gradual-change valve opening control to the positive cycle defrosting mode in Modification 2 (see FIG. 9), it would be acceptable to apply start-defrosting mode gradual-change valve opening control only. Start-defrosting mode gradual-change valve opening control and/or heating mode-reversion gradual-change valve opening control may also be applied to the positive cycle defrosting mode in Modification 1 (see FIG. 8).

In the present embodiment, at times that the positive cycle defrosting mode starts and/or at times of reverting from the positive cycle defrosting mode to the heating mode, the valve opening of the main valve 24 and of the superheat valve 27 is gradually changed to the target valve opening (start-defrosting mode gradual-change valve opening control and/or heating mode-reversion gradual-change valve opening control) in the aforedescribed manner. Thus, transient pressure fluctuations occurring when the positive cycle defrosting mode starts and/or when reverting from the positive cycle defrosting mode to the heating mode can be kept to a minimum. In so doing, the reliability of the compressor 21 can be ensured.

(6) Modification 4

In Modification 3, at times that the positive cycle defrosting mode starts and/or at times of reverting from the positive cycle defrosting mode to the heating mode, control of the valve opening of the main valve 24 and of the superheat valve 27 is switched, and running of the indoor fan 42 is switched as well.

Figure 11:
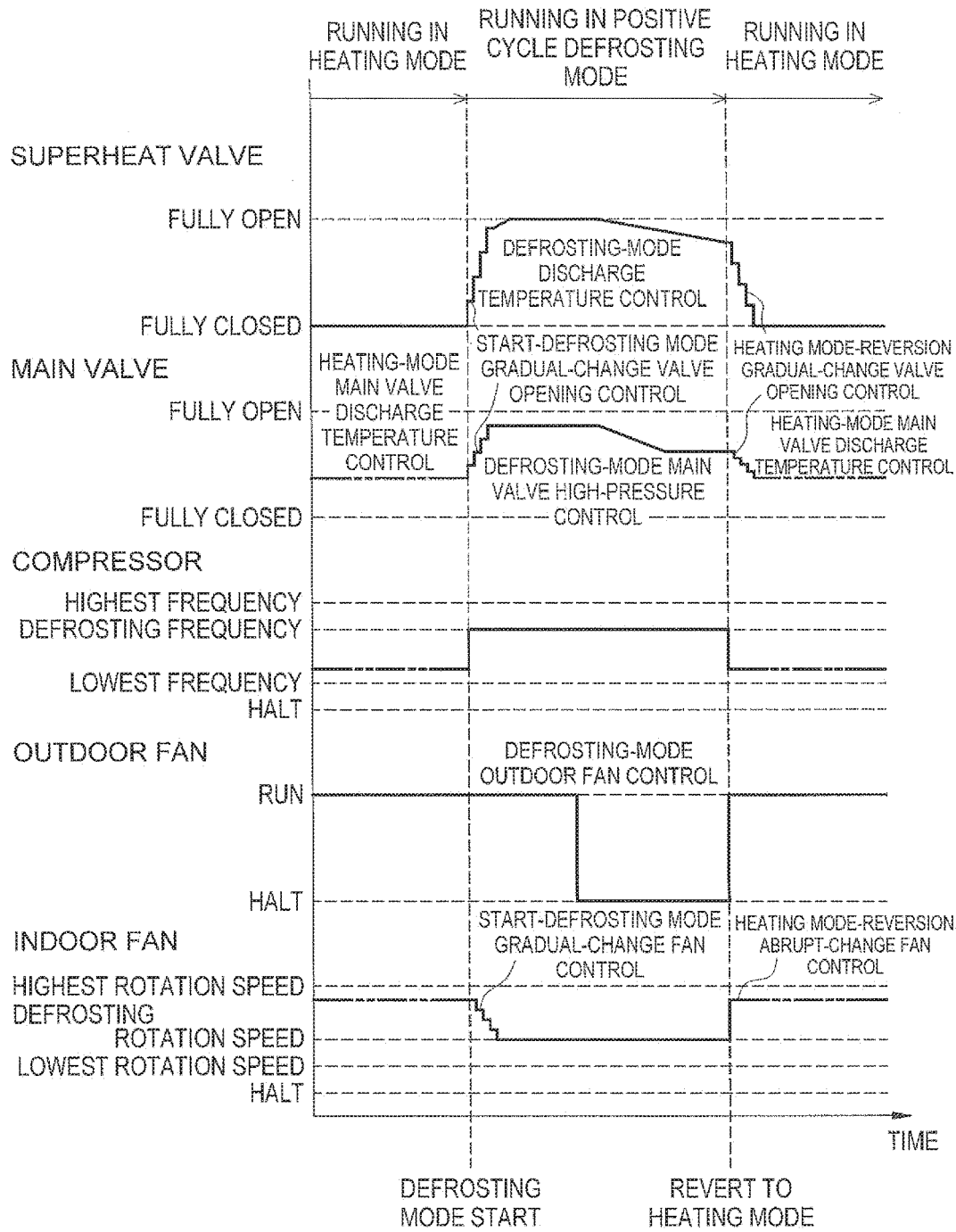
FIG. 11 is a time chart showing behavior of a superheat valve, a main valve, a compressor, an outdoor fan, and an indoor fan at times of running in positive cycle defrosting mode and in heating mode before and after, in Modification 4 of the present invention.

Here, as shown in FIG. 11, it would be acceptable to carry out start-defrosting mode gradual-change fan control to gradually change the rotation speed of the indoor fan 42 when starting the positive cycle defrosting mode, and to carry out heating mode-reversion fan abrupt-change control to abruptly change the rotation speed of the indoor fan 42 when reverting from the positive cycle defrosting mode to the heating mode. In specific terms, when starting the positive cycle defrosting mode, start-defrosting mode gradual-change fan control to gradually change the rotation speed of the indoor fan 42 from the set rotation speed for running in heating mode to the rotation speed for defrosting is carried out, doing so in several stages of 10 seconds to several tens of seconds in the same manner as with the main valve 24 and the superheat valve 27; and when reverting from the positive cycle defrosting mode to the heating mode, unlike when starting the positive cycle defrosting mode, heating mode-reversion abrupt-change control to abruptly change the rotation speed of the indoor fan 42 from the rotation speed for defrosting to the set rotation speed for running in heating mode is carried out. Control of other equipment (the superheat valve 27, the main valve 24, the compressor 21, and the outdoor fan 25) when running in the positive cycle defrosting mode is the same as in Modification 3.

In the present embodiment, when the positive cycle defrosting mode starts, the rotation speed of the indoor fan 42 is gradually changed (start-defrosting mode gradual-change fan control), and when reverting from the positive cycle defrosting mode to the heating mode, the rotation speed of the indoor fan is abruptly changed (heating mode-reversion abrupt-change control) in the aforedescribed manner. Thus, transient pressure fluctuations occurring when the positive cycle defrosting mode starts and/or when reverting from the positive cycle defrosting mode to the heating mode can be suppressed further, and with regard to running of the indoor fan 42, reversion to running in the heating mode can take place more rapidly, giving priority to improving the comfort of the indoors.

INDUSTRIAL APPLICABILITY

The present invention has wide potential application in air conditioning devices that have a discharge-intake bypass circuit used when running in positive cycle defrosting mode to defrost an outdoor heat exchanger while circulating a refrigerant in order through a compressor, an indoor heat exchanger, a main valve, and the outdoor heat exchanger.

REFERENCE SIGNS LIST

1 Air conditioning device
11 Main refrigerant circuit
21 Compressor
23 Outdoor heat exchanger
24 Main valve
25 Outdoor fan
26 Discharge-intake bypass circuit
27 Superheat valve
41 Indoor heat exchanger
53 Outdoor heat exchange temperature sensor
55 Indoor heat exchange temperature sensor

CITATION LIST

Patent Literature

Patent Literature 1
Japanese Laid-open Patent Application No. 61-262560

What is claimed is:
1. An air conditioning device, comprising:
a main refrigerant circuit having a compressor, an indoor heat exchanger, a main valve, and an outdoor heat exchanger, the main refrigerant circuit being configured to operate in a heating mode, the main refrigerant circuit being configured to circulate a refrigerant through the compressor, the indoor heat exchanger, the main valve, and the outdoor heat exchanger in order; and a discharge-intake bypass circuit having a superheat valve, the discharge-intake bypass circuit being connected to the main refrigerant circuit, the discharge-intake bypass circuit being configured such that, when the main refrigerant circuit is operating in the heating mode, it is possible for the refrigerant to bypass from a discharge side of the compressor to an intake side of the compressor;

the main refrigerant circuit being further configured to operate in a positive cycle defrosting mode in which the outdoor heat exchanger is defrosted while circulating refrigerant through the compressor, the indoor heat exchanger, the main valve, and the outdoor heat exchanger in order, and when the main refrigerant circuit is operating in the positive cycle defrosting mode, the superheat valve being configured to be opened so that the refrigerant is caused to bypass from the discharge side of the compressor to the intake side of the compressor through the discharge-intake bypass circuit and a defrosting-mode main valve high-pressure control being performed, the main valve being configured to adjust a valve opening of the main valve so that a high pressure level of a refrigerating cycle in the main refrigerant circuit reaches a target high pressure when the defrosting-mode main valve high-pressure control is performed.

2. The air conditioning device according to claim 1, wherein
the target high pressure is set to a value that is close to an upper limit value of the high pressure level when the main refrigerant circuit is operating in the heating mode.

3. The air conditioning device according to claim 1, wherein
the high pressure level is obtained from a refrigerant temperature detected by an indoor heat exchanger temperature sensor that is part of the indoor heat exchanger.

4. The air conditioning device according to claim 1, wherein
when the main refrigerant circuit is operating in the heating mode, a heating-mode main valve discharge temperature control is carried out, and
the main valve is further configured to adjust the valve opening of the main valve based on a temperature of the refrigerant at the discharge side of the compressor when the heating mode main valve discharge temperature control is carried out.

5. The air conditioning device according to claim 1, wherein
when the main refrigerant circuit is operating in the positive cycle defrosting mode, a defrosting-mode discharge temperature control is performed, and
the superheat valve is further configured to adjust a valve opening of the superheat valve such that a degree of a superheat of the refrigerant at the discharge side of the compressor is brought to a target discharge degree of the superheat when the defrosting-mode discharge temperature control is performed.

6. The air conditioning device according to claim 1, further comprising an outdoor fan arranged and configured to supply air to the outdoor heat exchanger, a defrosting-mode outdoor fan control being performed when the main refrigerant circuit is operating in the positive cycle defrosting mode, the outdoor fan being further configured to operate the outdoor fan in cases in which a refrigerant temperature detected by an outdoor heat exchange temperature sensor that is part of the outdoor heat exchanger has not risen to a fan stop temperature, and to halt operation of the outdoor fan in cases in which the refrigerant temperature has risen to the fan stop temperature, the fan stop temperature being a value close to an outside air temperature.

7. The air conditioning device according to claim 2, wherein
the high pressure level is obtained from a refrigerant temperature detected by an indoor heat exchanger temperature sensor that is part of the indoor heat exchanger.

8. The air conditioning device according to claim 2, wherein
when the main refrigerant circuit is operating in the heating mode, a heating-mode main valve discharge temperature control is carried out, and
the main valve is further configured to adjust the valve opening of the main valve based on a temperature of the refrigerant at the discharge side of the compressor when the heating mode main valve discharge temperature control is carried out.

9. The air conditioning device according to claim 2, wherein
when the main refrigerant circuit is operating in the positive cycle defrosting mode, a defrosting-mode discharge temperature control is performed, and
the superheat valve is further configured to adjust a valve opening of the superheat valve such that a degree of a superheat of the refrigerant at the discharge side of the compressor is brought to a target discharge degree of the superheat when the defrosting-mode discharge temperature control is performed.

10. The air conditioning device according to claim 2, further comprising
an outdoor fan arranged and configured to supply air to the outdoor heat exchanger,
a defrosting-mode outdoor fan control being performed when the main refrigerant circuit is operating in the positive cycle defrosting mode, the outdoor fan being further configured
to operate the outdoor fan in cases in which a refrigerant temperature detected by an outdoor heat exchange temperature sensor that is part of the outdoor heat exchanger has not risen to a fan stop temperature, and
to halt operation of the outdoor fan in cases in which the refrigerant temperature has risen to the fan stop temperature,
the fan stop temperature being a value close to an outside air temperature.

11. The air conditioning device according to claim 3, wherein
when the main refrigerant circuit is operating in the heating mode, a heating-mode main valve discharge temperature control is carried out, and the main valve is further configured to adjust the valve opening of the main valve based on a temperature of the refrigerant at the discharge side of the compressor when the heating mode main valve discharge temperature control is carried out.

12. The air conditioning device according to claim 3, wherein
when the main refrigerant circuit is operating in the positive cycle defrosting mode, a defrosting-mode discharge temperature control is performed, and
the superheat valve is further configured to adjust a valve opening of the superheat valve such that a degree of a superheat of the refrigerant at the discharge side of the compressor is brought to a target discharge degree of the superheat when the defrosting-mode discharge temperature control is performed.

13. The air conditioning device according to claim 3, further comprising
an outdoor fan arranged and configured to supply air to the outdoor heat exchanger,
a defrosting-mode outdoor fan control being performed when the main refrigerant circuit is operating in the positive cycle defrosting mode, the outdoor fan being further configured
to operate the outdoor fan in cases in which a refrigerant temperature detected by an outdoor heat exchange temperature sensor that is part of the outdoor heat exchanger has not risen to a fan stop temperature, and
to halt operation of the outdoor fan in cases in which the refrigerant temperature has risen to the fan stop temperature,
the fan stop temperature being a value close to an outside air temperature.

14. The air conditioning device according to claim 4, wherein
when the main refrigerant circuit is operating in the positive cycle defrosting mode, a defrosting-mode discharge temperature control is performed, and
the superheat valve is further configured to adjust a valve opening of the superheat valve such that a degree of a superheat of the refrigerant at the discharge side of the compressor is brought to a target discharge degree of the superheat when the defrosting-mode discharge temperature control is performed.

15. The air conditioning device according to claim 4, further comprising
an outdoor fan arranged and configured to supply air to the outdoor heat exchanger,
a defrosting-mode outdoor fan control being performed when the main refrigerant circuit is operating in the positive cycle defrosting mode, the outdoor fan being further configured
to operate the outdoor fan in cases in which a refrigerant temperature detected by an outdoor heat exchange temperature sensor that is part of the outdoor heat exchanger has not risen to a fan stop temperature, and
to halt operation of the outdoor fan in cases in which the refrigerant temperature has risen to the fan stop temperature,
the fan stop temperature being a value close to an outside air temperature.

16. The air conditioning device according to claim 5, further comprising
an outdoor fan arranged and configured to supply air to the outdoor heat exchanger,
a defrosting-mode outdoor fan control being performed when the main refrigerant circuit is operating in the positive cycle defrosting mode, the outdoor fan being further configured
to operate the outdoor fan in cases in which a refrigerant temperature detected by an outdoor heat exchange temperature sensor that is part of the outdoor heat exchanger has not risen to a fan stop temperature, and
to halt operation of the outdoor fan in cases in which the refrigerant temperature has risen to the fan stop temperature,
the fan stop temperature being a value close to an outside air temperature.

17. The air conditioning device according to claim 1, wherein
when the main refrigerant circuit is operating in the heating mode, a heating-mode main valve discharge temperature control is carried out, and the main valve is further configured to adjust the valve opening of the main valve based on a temperature of the refrigerant at the discharge side of the compressor when the heating mode main valve discharge temperature control is carried out, and
when the main refrigerant circuit is operating in the positive cycle defrosting mode, a defrosting-mode discharge temperature control is performed, and the main valve is further configured to adjust the valve opening of the main valve based on a temperature of the refrigerant at the indoor heat exchanger when the defrosting-mode discharge temperature control is performed.

18. The air conditioning device according to claim 1, wherein
the discharge-intake bypass circuit and the superheat valve are further configured so that refrigerant flows continuously through the discharge-intake bypass circuit when the defrosting operation is performed.

* * * * *